United States Patent [19]

Edmonds, Jr.

[11] 4,373,091

[45] Feb. 8, 1983

[54] ARYLENE SULFIDE POLYMER PURIFICATION

[75] Inventor: James T. Edmonds, Jr., Bartlesville, Okla.

[73] Assignee: Phillips Petroleum Company, Bartlesville, Okla.

[21] Appl. No.: 205,052

[22] Filed: Nov. 7, 1980

[51] Int. Cl.$^3$ .............................................. C08F 6/24
[52] U.S. Cl. .................................... 528/481; 528/483; 528/488
[58] Field of Search .................... 528/488, 481, 483

[56] References Cited

U.S. PATENT DOCUMENTS

| | | | |
|---|---|---|---|
| 3,707,528 | 12/1972 | Miles | 260/79 |
| 3,717,620 | 2/1973 | Rohlfing | 260/79 |
| 3,839,302 | 10/1974 | Miles | 260/79 |
| 3,948,865 | 4/1976 | Brady et al. | 264/122 |
| 4,025,496 | 5/1977 | Anderson et al. | 260/79.1 |
| 4,071,509 | 1/1978 | Edmonds, Jr. | 260/45.7 R |

*Primary Examiner*—Lorenzo B. Hayes
*Assistant Examiner*—Amelia B. Yarbrough

[57] ABSTRACT

Arylene sulfide polymers containing ash-forming impurities or materials are purified by contacting an aqueous mixture of such polymer with molecular oxygen and a chemical treating agent under conditions sufficient to reduce the ash-forming impurities and concurrently at least partially cure the polymer. In another embodiment, at least partially cured arylene sulfide polymers are treated with a chemical treating agent in the absence of molecular oxygen to stabilize the melt flow of the resin.

16 Claims, No Drawings

ARYLENE SULFIDE POLYMER PURIFICATION

This invention relates to the purification of arylene sulfide polymers containing ash-forming impurities and to improving the melt stability of arylene sulfide polymers. In accordance with another aspect, this invention relates to a process for the reduction of ash-forming impurities contained in arylene sulfide polymers and concurrently at least partially curing the polymer during deashing of the polymer. In another aspect, this invention relates to the process for improving the melt stability of arylene sulfide polymers. In accordance with a further aspect, this invention relates to a process for the reduction of ash-forming impurities present in arylene sulfide polymers by heating a slurry of the polymer in water in the presence of an oxygen-containing gas and a water soluble chemical treating agent to simultaneously deash and at least partially cure the polymer to higher molecular weight polymers. In yet another aspect, the melt flow of at least partially cured arylene sulfide polymers is stabilized by treating the polymers with selected water soluble chemical compounds. In yet another aspect of the invention, it relates to the improvement of color and other properties of arylene sulfide polymers by specific treatment of aqueous slurries of the polymer during production of the polymer.

In applications such as in the production of fibers and films from arylene sulfide polymers, it is desirable that the amount of ash-forming impurities in the arylene sulfide polymer be as low as possible and, in many instances, below about 1 wt. % in order to meet product (customer) specification. Various procedures have been utilized to purify arylene sulfide polymers containing ash-forming impurities or materials. In addition, arylene sulfide polymers ranging in consistency from viscous liquids to crystalline solids are known. While such polymers exhibit desirable properties for many applications such as molding compositions, the unmodified polymers normally possess a relatively high melt flow, e.g., above 4,000, or the modified polymers exhibit melt flow instability which inhibits their use. It has now been discovered that arylene sulfide polymers can be treated in a manner such that the polymers are essentially freed of ash-forming materials and concurrently cured to a higher molecular weight product exhibiting reduced melt flow or at least partially cured polymers can be treated with selected chemical compounds to effect stabilization of the melt flow of the polymer.

Accordingly, an object of this invention is to provide a process for improving the color, melt flow stability, and other properties of arylene sulfide polymers.

A further object of this invention is to provide an improved process for the reduction of ash-forming impurities contained in arylene sulfide polymers and, at the same time, at least partially cure the polymer.

A further object of this invention is to provide arylene sulfide polymers having increased utility by reducing the ash-forming impurities present in the polymers and producing a polymer of reduced melt flow.

A further object of this invention is to provide at least partially cured arylene sulfide polymers exhibiting improved melt flow stability.

Other objects, aspects, and the several advantages of the invention will be apparent to those skilled in the art upon a study of the specification and the appended claims.

According to the invention, the amount of ash-forming impurities contained in arylene sulfide polymers is reduced and/or the melt flow of at least partially cured arylene sulfide polymers is stablized by heating the polymer slurried in an aqueous medium in the presence of at least one water soluble chemical compound selected from (1) metal salts of Groups IA, II and IIIA metals, (2) organic acids, and (3) inorganic basic compounds under conditions of temperature and a period of time sufficient to reduce the amount of ash-forming impurities and/or stabilize the melt flow of at least partially cured arylene sulfide polymers.

In accordance with one embodiment, arylene sulfide polymers, such as polyphenylene sulfide, are essentially freed of alkali metal halide (deashing) to meet product specifications and concurrently cured to higher molecular weight polymers by contacting raw polymer, water, molecular oxygen, and a water soluble chemical treating agent at an elevated temperature and pressure for a period of time sufficient to appreciably reduce the amount of ash-forming impurities and effect at least partial cure of the polymer and substantially reduce the melt flow thereof in relationship to the starting polymer material.

In accordance with a second embodiment, at least partially cured arylene sulfide polymers are treated with at least one water soluble chemical compound selected from (1) melt salts of Groups IA, II and IIIA metals, (2) organic acids, and (3) inorganic basic compounds at an elevated temperature and for a period of time sufficient to effect substantial stabilization of the melt flow of the polymer.

In both embodiments, the treatment is normally carried out with purified, finely divided resin to expedite contact with the treating agents. The treating step can be carried out with dry resin after it has been purified to substantially remove contaminants such as metal halides, organic solvents, metal sulfides, and other impurities which can be present in the crude reactor product.

Arylene sulfide polymers which can be employed in the process of this invention include arylene sulfide polymers generally which contain ash-forming impurities as specified above and which have a melt flow of at least about 1,000 and generally within the range of about 3,000 to about 15,000, and higher (determined by the method of ASTM D 1238-70, modified to a temperature of 316° C. using a 5-kg weight, the value being expressed as g/10 min.). Thus, the arylene sulfide polymers can be linear, branched, or lightly crosslinked. Although the method by which the polymers of this description are produced is not critical, preferably the polymer employed in the process is prepared by use of polyhalo aromatic compounds, alkali metal sulfides, and organic amides. For example, the arylene sulfide polymer for use in this invention can be produced by the method of U.S. Pat. No. 3,354,129. Alternatively, the polymer employed is prepared by use of a p-dihalobenzene, an alkali metal sulfide, an organic amide, and an alkali metal carboxylate, as in U.S. Pat. No. 3,919,177, optionally together with an alkali metal hydroxide such as sodium hydroxide, e.g., in an amount up to about 0.8 mole of alkali metal hydroxide per mole of alkali metal sulfide and/or a polyhalo aromatic compound such as 1,2,4-trichlorobenzene, e.g., in an amount up to about 0.6 part by weight per 100 parts by weight p-dihalobenzene. If desired, a lithium halide such as lithium chloride can be used instead of the alkali metal carboxylate to produce the polymer. If desired, water which can be present with the reactants can be removed by distillation prior to the polymerization reaction.

The finely divided resin used in this invention, as typified by poly(phenylene sulfide) or PPS for short and made according to U.S. Pat. No. 3,354,129, is a free flowing white powder having a particle size range averaging from about 5 to about 1500 micrometres and generally ranges from about 10 to about 150 micrometres.

It is to be understood that the process of this invention can be carried out in a number of ways. In one mode of operation, the reaction mass comprising particulate polymer, alkali metal halide, and organic amide can be subjected to suitable separation techniques to recover polymer freed, as much as possible, of organic amide, unreacted reactants, and alkali metal halide. For example, the polymer can be recovered from the reaction slurry and then combined with water to extract ash-forming materials. The amount of impurities (ash) remaining from this operation prior to treatment, according to the invention, can range from about 0.5 to about 1 wt. % and higher.

The chemical treating compounds (agents) of this invention are water soluble and can be selected from metal salts derived from the elements of Periodic Groups IA, II, and IIIA since many of these are colorless, water soluble, and relatively inexpensive; acidic compounds such as carboxylic acids, e.g., acetic acid, propionic acid, tartaric acid, etc., and inorganic basic compounds including ammonium hydroxide and the hydroxides of the alkali and alkaline earth metals.

Specific treating agents include lithium acetate, sodium carbonate, potassium bicarbonate, sodium bicarbonate, barium acetate, calcium acetate, magnesium propionate, zinc nitrate, aluminum acetate, glacial acetic acid, concentrated ammonium hydroxide (30%), sodium hydroxide and the like. Particularly preferred compounds because of special efficacy in the processes include sodium carbonate and sodium hydroxide in embodiment 1. Barium acetate, calcium acetate, acetic acid, sodium carbonate, sodium bicarbonate, and sodium hydroxide are preferred in embodiment 2.

In accordance with the first embodiment of the invention, phenylene sulfide polymer containing ash-forming materials is contacted in an aqueous slurry with at least one chemical treating agent as defined herein and an oxygen-containing gas at an elevated temperature and pressure for a period of time sufficient to substantially reduce the amount of ash-forming materials in the polymer and, at the same time, at least partially cure the polymer product and reduce the melt flow thereof.

In accordance with the second embodiment of the invention, phenylene sulfide polymer which is at least partially cured and which can contain ash-forming materials is contacted in an aqueous slurry with at least one chemical treating agent as defined herein in the substantial absence of molecular oxygen at an elevated temperature and for a period of time sufficient to substantially stabilize the melt flow of the polymer being treated.

The melt stability of the polymer treated according to this invention can be assessed by noting its changes in melt flow after being retained in the barrel of the melt index apparatus of ASTM D 1238 for 5 minutes and for 30 minutes at 316° C. Melt flow at these arbitrarily selected times is then determined as usual by adding the 5 kg weight and weighing the cooled extrudate. If little or no change occurs from 5 minutes to 30 minutes then it is apparent that a melt flow stable product is being tested. Generally, a melt flow decrease occurs. However, in some instances a melt flow increase occurs. For the purposes of this invention a change of more than about ±50% is arbitrarily deemed to be not acceptable.

In the second embodiment of this invention, particulate precured polymer is treated with an agent in the absence of molecular oxygen at elevated temperatures and pressures. By proper selection of the treating agent it is possible to increase or decrease the melt flow of the polymer employed. The magnitude of the difference can vary from about 1.1 to about 25 fold and usually from about 1.5 to about 5 fold in either direction. The final recovered product exhibits further resistance to melt flow change in the test previously described. As before a change in melt flow of more than about ±50% is considered to be unacceptable.

The heating to effect deashing and concurrent curing and/or melt flow stabilization can be carried out at an elevated temperature which is below the melting point of the polymer for a period of time sufficient to effect deashing and at least partial curing. Normally, the contacting will be at least about 300° F. and will not exceed about 25° F. below the melting point of the polymer. Ordinarily, the contacting temperatures will be in the range of about 350° F. to about 520° F.

The time for treatment or contacting can vary greatly depending, in part, on the temperature and the nature of the arylene sulfide polymer. It generally will be within the range of about 5 minutes to about 24 hours, preferably about 30 minutes to about 10 hours. For example, with a given slurry and to effect a given reduction in melt flow, the contact time decreases with increasing temperature. The pressure should be sufficient to maintain liquid phase conditions which can range from about 0 to about 1,500 psia. Repeated treatments can be employed, if desired, and the process can be carried out in several stages, if desired.

As indicated above, in the first embodiment of the invention the heating is carried out in the presence of an oxygen-containing gaseous oxidizing atmosphere such as air, pure oxygen, and the like. The oxidizing gas rate, with respect to contacting of the particulate polymer in the slurry, will vary appreciably depending upon the type of apparatus employed for carrying out the oxidative curing and deashing. If desired, the oxygen-containing gas can be heated prior to contacting with the polymer slurry. The weight ratio of polymer to oxygen can vary widely but generally ranges from about 5:1 to about 1,000:1.

The polymer/water slurry can consist of about 10 to about 60 wt. % polymer and more preferably from about 20 to about 50 wt. % polymer to provide convenient handling and separation factors.

After the purification and drying steps, the resin is left in the form of a finely divided, free flowing, white powder. In the processes of this invention it is preferred to utilize such finely divided resin to expedite contact with the water and treating agents.

The processes of this invention can be conducted batchwise or continuously.

The heating and contacting with the chemical treating agent, according to the invention, can be carried out in conventional equipment. A convenient method for carrying out the process is to contact the polymer slurry with the oxygen-containing gaseous medium and/or chemical treating agent in an enclosed tank provided with agitation. The contacting can be carried out in a single vessel or with a plurality of vessels. The polymer can be separated from the slurry after contacting by suitable techniques including pressure reduction to atmospheric, filtration, and the like, and allowing the polymer to be subsequently dried for further use as desired.

The following examples are intended to illustrate the compositions and process of the invention.

EXAMPLE 1

Slurry Curing, Treating Agent Present

A series of runs was made in a 2 gal (7.6 L) stirred, stainless steel reactor by charging it in order with 2420 mL of previously boiled deionized water, a specified amount of PPS, and a specified amount of chemical treating agent. With the stirrer operating at 1000 RPM the reactor was purged with nitrogen to displace the air and the reactor and contents were heated to 460° F. (238° C.). At that time air was charged to the reactor in a specified amount and then run was started. At the conclusion of the run, the reactor and contents were cooled and relatively quickly by means of an internal water cooled coil, the gases vented, and the product recovered by filtration. The filter cake was washed with hot, deionized water, then with acetone, and the product dried overnight (about 16 hours) in a vacuum oven set at 200° F. (93° C.). The dry polymer was weighed to determine the yield and portions of it were used in ash and melt flow determinations.

The treating agents and conditions employed and the results obtained are given in Table 1.

The source of the PPS in this series were commercial lots having melt flows in the range of 3,000–12,000 g/10 minutes. The ash contact of the PPS used in runs 1, 2 was 0.60 wt. % and in the remainder of the runs was 0.82 wt. %.

The results presented in Table 1 in control runs 1 and 2 indicate that PPS cured in water slurry in the presence of molecular oxygen is relatively unstable in melt form based on the melt flow test. Thus, the PPS continues to decrease in melt flow as time elapses. However, as invention runs 4–12 indicate, when the curing takes place in the presence of sodium hydroxide or sodium carbonate, the recovered products exhibit enhanced stability in the melt based on the melt flow test. Such enhanced melt stability would be desirable in extrusion and injection molding applications, particularly if relatively short delays in the operation were experienced from time to time. Control run 13 suggests that in this embodiment at least, acetic acid is of little value in promoting melt stability. Runs 14 and 15 imply that about 1 mole $NH_3$ present in the curing operation will improve polymer melt stability but that an excessive amount, e.g., about 2 moles, can decrease polymer melt stability. Control runs 16 and 17 taken in conjunction with invention runs 4–12, suggest that an easily water soluble metal carbonate is needed to improve polymer melt stability. Relatively insoluble carbonates such as $CaCO_3$ and $MgCO_3$ functioned poorly as the melt flow results show. Control runs 18 and 19 suggest that metal acetates are not effective in this embodiment.

EXAMPLE 2

Another series of runs was performed as before except that molecular oxygen was omitted from the reactor and the particulate PPS base polymer was already precured. The precuring can be carried out as in the first example or in any convenient fashion.

The treating agents and conditions employed and the results obtained are given in Table 2.

TABLE 1

Pressurized PPS-Oxygen-Water-Treating Agent Process
2240 mL Water, 238° C., 2.86 MPa Added Air (or 0.448 MPa Added Oxygen)

| Run No. | PPS g | Treating Agent Formula | Treating Agent g | Treating Agent mole | Maximum Reactor Press psia | Maximum Reactor Press MPa | Reaction Time hours | Product Recovered wt. % | Product Ash wt. % | Melt Flow 5 min | Melt Flow 30 min | Melt Flow % change | Remarks |
|---|---|---|---|---|---|---|---|---|---|---|---|---|---|
| 1[a] | 600 | None | 0 | 0 | 545 | 3.76 | 4 | 92 | 0.24 | 232 | 2 | 99 | control |
| 2[a] | 600 | None | 0 | 0 | 545 | 3.76 | 4 | 92 | .46 | 69 | 1.6 | 98 | control |
| 3 | 600 | None | 0 | 0 | 865 | 5.96 | 1.5 | 95 | .29 | 212 | nd[g] | nd | control |
| 4 | 600 | NaOH | 40 | 1.0 | 870 | 6.00 | 1.5 | nd | 1.5 | 275 | 271 | 5.1 | invention |
| 5[b] | 600 | NaOH | 40 | 1.0 | 865 | 5.96 | 3 | 92 | 1.2 | 72 | 57 | 21 | invention |
| 6 | 600 | NaOH | 40 | 1.0 | 865 | 5.96 | 1.5 | 95 | 0.90 | 482 | 521 | −8.1[c] | invention |
| 7 | 600 | $Na_2CO_3.H_2O$ | 40 | 0.32 | 860 | 5.93 | 1.5 | 90 | .83 | 280 | 199 | 29 | invention |
| 8 | 600 | " | 40 | 0.32 | 869 | 5.96 | 1.5 | 91 | .74 | 212 | 161 | 24 | invention |
| 9 | 600 | " | 41.4 | 0.33 | 880 | 6.07 | 4.5 | 87 | .98 | 73 | 61 | 16 | invention |
| 10 | 600 | " | 124 | 1.0 | 865 | 5.96 | 1.5 | 86 | .87 | 376 | 368 | 2.1 | invention |
| 11 | 600 | " | 40 | 0.32 | 875 | 5.03 | 3 | 93 | .61 | 104 | 65 | 37 | invention |
| 12 | 600 | " | 124 | 1.0 | 865 | 5.96 | 3 | 93 | 1.0 | 166 | 124 | 25 | invention |
| 13 | 600 | HOAc (glacial)[d] | 62.9 | 1.0 | 865 | 5.96 | 1.5 | 87 | 0.23 | 234 | 44 | 81 | control |
| 14 | 600 | $NH_4OH$, 30% | 60 mL | 0.94 ($NH_3$) | 860 | 5.93 | 1.5 | 88 | .32 | 386 | 296 | 23 | invention |
| 15 | 600 | " | 120 mL | 1.9 ($NH_3$) | 870 | 6.00 | 3 | 95 | .34 | 330 | 109 | 67 | control |
| 16 | 600 | $CaCO_3$ | 50 | 0.50 | 880 | 6.07 | 3 | 99 | .87 | 165 | 1 | 94 | control |
| 17 | 600 | $MgCO_3$ | 50 | .59 | 905 | 6.24 | 3 | 94 | .98 | 34.4 | 2.4 | 93 | control |
| 18[e] | 600 | $Ca(OAc)_2.H_2O$ | 75 | .43 | 875 | 6.03 | 3 | 89 | 2.3 | 46 | 8 | 83 | control |
| 19[f] | 600 | $Co(OAc)_2.4H_2O$ | 20 | .08 | 880 | 6.07 | 3 | 91 | 2.2 | 71 | 5 | 93 | control |

Notes:
[a]PPS lot having 0.60 wt. % ash, pure oxygen (0.448 MPa) added to reactor.
[b]After 1.5 hours, cool to 100° F., depressure to 15 psia, reheat to 238° C., repressure with air to 865 psia and continue run.
[c]A minus indicates an increase in melt flow
[d]HOAc is acetic acid.
[e]$Ca(OAc)_2$ is calcium acetate.
[f]$Co(OAc)_2$ is cobalt acetate.
[g]nd is not determined.

TABLE 2

Pressurized PPS-Water-Treating Agent Stabilization Treatment
238° C., 2420 mL Water

| Run No. | PPS Source | PPS g | Treating Agent Formula | Treating Agent g | Treating Agent mole | Air ($O_2$) Added psia | Air ($O_2$) Added MPa | Reaction Time Hours | Recovered wt. % | Ash wt. % | Melt Flow 5 min | Melt Flow 30 min | Melt Flow % change | Remarks |
|---|---|---|---|---|---|---|---|---|---|---|---|---|---|---|
| 20 | A[a] | 600 | None | 0 | 0 | 65($O_2$) | 0.448 | 4[b] | 92 | 0.24 | 232 | 2 | 99 | control |
| 21 | Run 20 | 200 | NaOH | 20 | 0.5 | 9 | — | 2 | 76 | 0.75 | 87 | 100 | −15[d] | invention |
| 22 | Run 20 | 200 | $NaHCO_3$ | 80 | 0.95 | 9 | — | 3 | 86 | 0.59 | 105 | 66 | 37 | invention |
| 23 | A | 600 | $Na_2CO_3.H_2O$ | 124 | 1.0 | 415 air | 2.86 | 3 | 93 | 0.94 | 152 | 132 | 13 | reference (control) |
| 24 | Run 23 | 500 | HOAc, glacial | 105 | 1.7 | 0 | — | 3 | 94 | 0.47 | 630 | 624 | 1 | invention |
| 25 | Run 24 | 200 | $Ca(OAc)_2.H_2O$ | 50 | 0.28 | 0 | — | 3 | 90 | 0.78 | 31 | 30 | 3.3 | invention |
| 26 | Run 24 | 200 | NaOH | 20 | 0.50 | 0 | — | 3 | 90 | 0.86 | 162 | 136 | 16 | invention |
| 27 | A | 600 | $Na_2CO_3.H_2O$ | 124 | 1.0 | 65($O_2$) | 0.488 | 6[c] | 93 | 0.84 | 160 | 177 | −11 | reference (control) |
| 28 | Run 27 | 200 | $Ca(OAc)_2.H_2O$ | 50 | 0.28 | 0 | — | 3 | nd | 0.86 | 84 | 76 | 9.5 | invention |
| 29 | Run 27 | 200 | $Ba(OAc)_2$ | 50 | 0.20 | 0 | — | 3 | nd | 1.3 | 102 | 109 | −2 | invention |

[a] Commercial lot, ash = 0.60 wt. %, melt flow in range of 3,000–12,000
[b] After 2 hours, added 20 psia (0.138 MPa) oxygen to restore reactor pressure to original value of 545 psia (3.76 MPa).
[c] After 2 hours and 4 hours, added 65 psia oxygen to restore reactor pressure to original value of 535 psia (3.69 MPa).
[d] Minus value signified a melt flow increase.

The results given in Table 2 illustrate the versatility of embodiment 2 of this invention and suggest that polymer melt flow can be regulated (manipulated) to some extent by proper choice of the treating agent.

Thus, portions of polymer cured in water slurry in the absence of a treating agent (run 20) was treated with NaOH or $NaHCO_3$ in invention runs 21 and 22. The recovered polymers having reduced melt flow compared to the initial value are shown to be quite stable in the melt flow test unlike the initial behavior. NaOH is seen to provide better results than $NaHCO_3$ in these runs.

In reference runs 23 and 27 polymer samples curred according to embodiment 1 are further treated according to embodiment 2. Thus runs 23–26 should be compared with one another and runs 27–29 should be compared with one another.

The reference polymer made in run 23 was treated in invention run 24 with acetic acid. As a result the melt flow (5 minutes hold) was increased from 152 to 630 but an extremely melt stable polymer resulted. Portions of the run 24 polymer were separately treated in invention runs 25 and 26 with calcium acetate and sodium hydroxide, respectively. The resulting polymers were found to have substantially reduced melt flows, 31 and 162, respectively, but quite thermally stable polymers nevertheless resulted.

The sane comparison made with the polymers of invention runs 28 and 29 with the reference polymer of run 27 shows that barium acetate and calcium acetate are effective treating agents in embodiment 2.

We claim:

1. A process for the reduction of ash-forming impurities contained in arylene sulfide polymers and/or stabilize the melt flow of at least partially cured arylene sulfide polymers which polymers have been purified to substantially remove contaminants such as metal halides, organic solvents, metal sulfides, and other impurities present in the crude reaction product which comprises contacting an aqueous slurry consisting essentially of particulate purified arylene sulfide polymer containing ash-forming impurities and/or at least partially cured purified arylene sulfide polymer and water with an oxygen-containing gas and at least one water soluble chemical treating agent selected from sodium hydroxide and sodium carbonate at an elevated temperature not exceeding about 25° F. below the melting point of the polymer for a period of time sufficient to reduce the ash content and stabilize the melt flow of the polymer.

2. A process according to claim 1 wherein said contacting is effected at a temperature above at least about 300° F. and said oxygen-containing gas is air.

3. A process according to claim 2 wherein said arylene sulfide polymer is polyphenylene sulfide and said contacting is effected at a temperature in the range of about 300° F. to about 520° F.

4. A process according to claim 1 comprising the steps of
   (a) producing a slurry of arylene sulfide polymer containing ash-forming impurities in water at a temperature above about 300° F., but not exceeding about 25° F. below the melting point of the polymer,
   (b) contacting the slurry of (a) under oxidizing conditions with an oxygen-containing gas for a period of time sufficient to at least partially cure and reduce the melt flow of the polymer and, at the same time, reduce the ash-forming impurities in the polymer, and
   (c) separating from said slurry at least partially cured polymer substantially freed of ash-forming impurities.

5. A process according to claim 6 wherein said contacting temperature is in the range of about 300° F. to about 520° F., said arylene sulfide polymer is polyphenylene sulfide, and said oxygen-containing gas is air.

6. A process for the reduction of ash-forming impurities contained in arylene sulfide polymers and/or stabilize the melt flow of at least partially cured arylene sulfide polymers which polymers have been purified to substantially remove contaminants such as metal halides, organic solvents, metal sulfides, and other impurities present in the crude reaction product which comprises contacting an aqueous slurry consisting essentially of particulate purified arylene sulfide polymer containing ash-forming impurities and water in the absence of added oxygen-containing gas with at least one water soluble chemical treating agent selected from
   (a) alkaline earth metal carboxylates
   (b) organic acids and (c) inorganic basic compounds selected from hydroxides and carbonates of the alkali and alkaline earth metals, at an elevated temperature not exceeding about 25° F. below the melting point of the polymer for a period of time sufficient to reduce the ash content and stabilize the melt flow of the polymer.

7. A process according to claim 6 wherein said contacting is effected at a temperature above about 300° F. and said arylene sulfide polymer is polyphenylene sulfide.

8. A process according to claim 6 wherein said chemical treating agent is barium acetate, calcium acetate, acetic acid, sodium carbonate, sodium bicarbonate, or sodium hydroxide.

9. A process according to claim 8 wherein said arylene sulfide polymer is polyphenylene sulfide and said contacting is effected at a temperature in the range of about 300° F. to about 520° F.

10. A process according to claim 6 comprising the steps of
(a) producing a slurry of at least partially cured arylene sulfide polymer in water at a temperature above about 300° F., but not exceeding about 25° F. below the melting point of the polymer,
(b) contacting the slurry of (a) with said chemical treating agent in the substantial absence of molecular oxygen under conditions and for a period of time to stabilize the melt flow of the polymer, and
(c) separating from said slurry polymer exhibiting a stabilized melt flow.

11. A process according to claim 10 wherein said contacting temperature is in the range of about 300° F. to about 520° F.

12. A process according to claim 11 wherein said chemical treating agent is barium acetate, calcium acetate, acetic acid, sodium carbonate, sodium bicarbonate, or sodium hydroxide.

13. A process according to claim 12 wherein said arylene sulfide polymer is polyphenylene sulfide.

14. A process according to claim 6 wherein said treating agent is an alkaline earth metal carboxylate and said polymer is polyphenylene sulfide.

15. A process according to claim 6 wherein said treating agent is an alkali metal hydroxide or carbonate and said polymer is polyphenylene sulfide.

16. A process according to claim 6 wherein said treating agent is an organic acid and said polymer is polyphenylene sulfide.

* * * * *